(12) United States Patent
Diehl et al.

(10) Patent No.: US 10,169,934 B2
(45) Date of Patent: Jan. 1, 2019

(54) BUILDING ACCESS AND LAYOUT MAPPING FOR AN AUTONOMOUS VEHICLE BASED TRANSPORTATION SYSTEM

(71) Applicant: GM GLOBAL TECHNOLOGY OPERATIONS LLC, Detroit, MI (US)

(72) Inventors: Jason E Diehl, Washington Township, MI (US); Jim K. Rainbolt, Haslett, MI (US); Mary E. Decaluwe, Oxford, MI (US); Janet S Goings, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/400,145

(22) Filed: Jan. 6, 2017

(65) Prior Publication Data

US 2017/0213403 A1    Jul. 27, 2017

Related U.S. Application Data

(60) Provisional application No. 62/287,430, filed on Jan. 26, 2016.

(51) Int. Cl.
| | |
|---|---|
| *G07C 9/00* | (2006.01) |
| *G08G 1/00* | (2006.01) |
| *G01C 21/34* | (2006.01) |
| *G08G 1/005* | (2006.01) |

(52) U.S. Cl.
CPC ..... *G07C 9/00007* (2013.01); *G01C 21/3461* (2013.01); *G08G 1/005* (2013.01); *G08G 1/202* (2013.01); *G07C 9/00103* (2013.01)

(58) Field of Classification Search
CPC ............ G06K 7/0008; G06K 19/0723; G06K 7/10009; G06K 7/10366; G06K 7/10316; G06K 19/07749; G06K 7/10356; G06K 19/0717
USPC ........................................................ 340/10.1
See application file for complete search history.

(56) References Cited

U.S. PATENT DOCUMENTS

| | | | | |
|---|---|---|---|---|
| 8,914,225 | B2 * | 12/2014 | Caskey ................... | G08G 1/00 701/117 |
| 2015/0166009 | A1 * | 6/2015 | Outwater ............... | B60R 25/04 701/2 |

* cited by examiner

*Primary Examiner* — Mark S Blouin
(74) *Attorney, Agent, or Firm* — Lorenz & Kopf, LLP (57) ABSTRACT

Enhanced features of a vehicle-based transportation system are presented here. In accordance with one methodology, the transportation system receives a ride request that identifies a passenger, a pickup location, and a destination location. The transportation system determines that the passenger requires user-specific security clearance to access a secured area at or near the destination location, and coordinates with a security system to grant the user-specific security clearance to the passenger. The transportation system can also determine a vehicle drop-off location based on the passenger destination, and coordinate with a navigation system to obtain navigation instructions to guide the passenger from the vehicle drop-off location to the passenger destination.

13 Claims, 4 Drawing Sheets

BUILDING ACCESS AND LAYOUT MAPPING FOR AN AUTONOMOUS VEHICLE BASED TRANSPORTATION SYSTEM

CROSS-REFERENCE TO RELATED APPLICATION

This application claims the benefit of United States provisional patent application No. 62/287,430, filed Jan. 26, 2016.

TECHNICAL FIELD

Embodiments of the subject matter described herein relate generally to transportation systems. More particularly, embodiments of the subject matter relate to enhanced features suitable for use in an autonomous vehicle based transportation system.

BACKGROUND

Driverless vehicles have been under development for several years. An autonomous vehicle uses onboard sensor systems, global positioning system (GPS) technology, navigation systems, and drive-by-wire systems to transport passengers on roads that may be occupied by traditional vehicles and/or other autonomous vehicles.

It is desirable to have enhanced features, operating methods, and functions in an autonomous vehicle transportation system. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to the control and operation of autonomous (i.e., driverless or self-driving) vehicles, mobile client devices, navigation and mapping systems, the global positioning system (GPS), security and access control systems, shipping and delivery systems, signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter described herein relates to a vehicle based transportation system. In certain implementations, the vehicle based transportation system includes at least one driverless vehicle that is automatically controlled to carry passengers from one location to another. Although the exemplary embodiments are particularly suitable for use in the context of a taxi or shuttle system in a relatively small geographical area (such as a school or business campus, a shopping center, an amusement park, an event center, or the like), the techniques and technologies presented herein are not limited to such an application. The disclosed subject matter provides certain enhanced features and functionality to what may be considered as a standard or baseline autonomous vehicle system. To this end, an autonomous vehicle based transportation system can be modified, enhanced, or otherwise supplemented to provide the additional features mentioned in more detail below.

Figure 1:
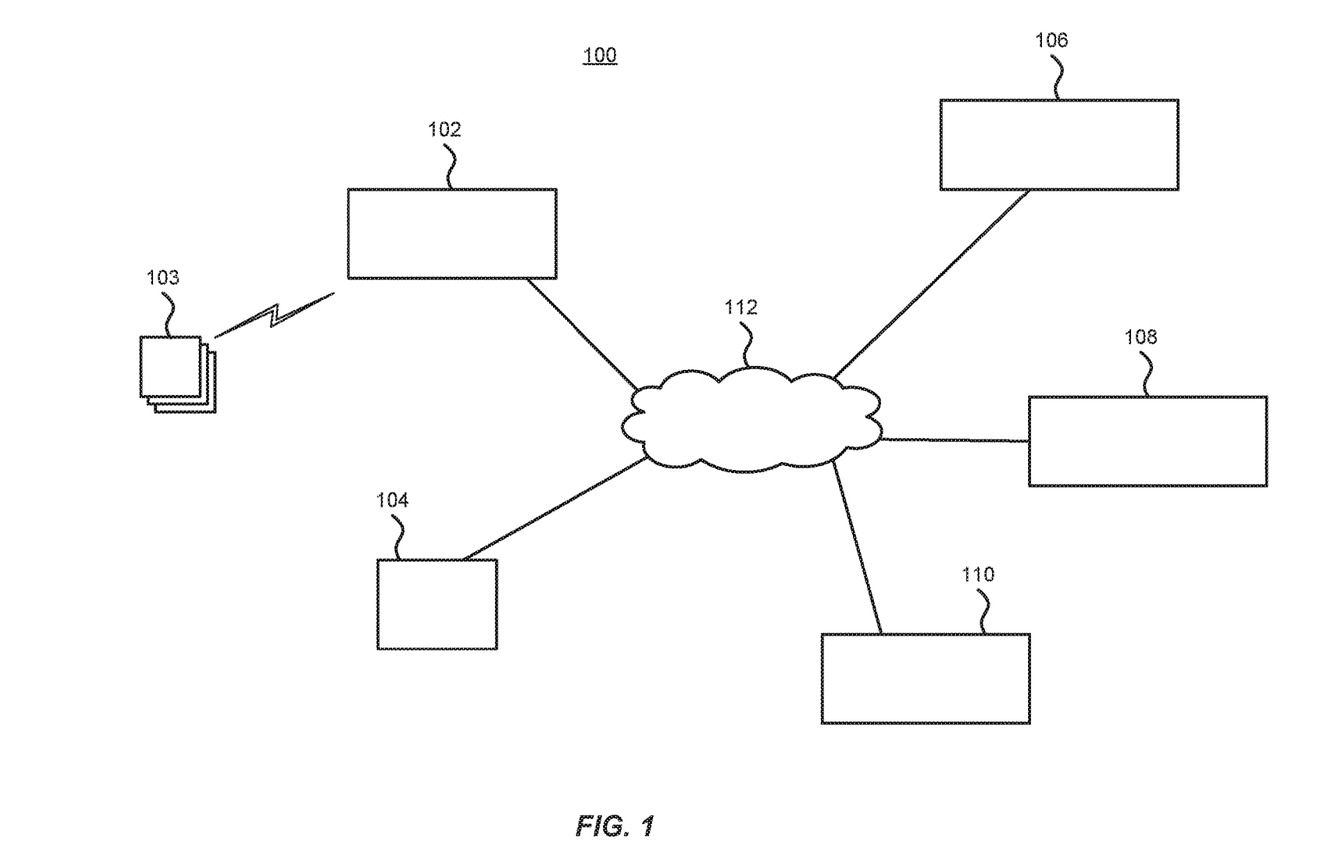
FIG. 1 is a simplified block diagram that illustrates an autonomous vehicle based transportation system and related systems and subsystems.

FIG. 1 is a simplified block diagram of an exemplary embodiment of an operating environment 100 that includes an autonomous vehicle based transportation system 102 and related systems and subsystems. The techniques and methodologies described with reference to the operating environment 100 can also be implemented in the context of other system architectures and environments. The operating environment 100 described here represents one practical scenario that can benefit from certain enhanced features. The illustrated embodiment of the operating environment 100 includes, without limitation: the transportation system 102; at least one user device 104; a building security and access system 106; a shipping/delivery system 108; a navigation and map system 110; and a communication network 112. The devices, systems, and components supported by the operating environment 100 can communicate with one another (via tangible communication links and/or wireless communication links) as needed via the communication network 112.

Although only one user device 104 is shown in FIG. 1, an embodiment of the operating environment 100 can support any number of user devices 104, including multiple user devices 104 owned, operated, or otherwise used by one person. Each user device 104 supported by the operating environment 100 may be implemented using any suitable hardware platform. In this regard, a user device 104 can be realized in any common form factor including, without limitation: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 104 supported by the operating environment 100 is realized as a computer-implemented or computer-based device having the hardware, software, firmware, and/or processing logic needed to carry out the various techniques and methodologies described in more detail herein.

The autonomous vehicle based transportation system 102 includes one or more driverless (autonomous) vehicles (identified in FIG. 1 as AVs 103), along with the corresponding onboard native processing, control, and computing intelligence and logic. The transportation system 102 may also include one or more backend server systems, which may be cloud-based, network-based, or resident at the particular campus or geographical location serviced by the transportation system 102. The backend system can communicate with the user devices 104 operated by passengers to schedule rides, dispatch the vehicles 103, and the like. In addition, the backend system can communicate with the building security and access system 106, the shipping/delivery system 108, and/or the navigation and map system 110 as needed.

The operating environment 100 can include any number of predefined vehicle pickup/drop-off locations that are known to the transportation system 102. Alternatively or additionally, the transportation system 102 can leverage GPS technology to pick up passengers at any location and/or to leave passengers at any desired destination location. In accordance with a typical use case workflow, a registered user of the transportation system 102 can create a ride request via the user device 104. The ride request will typically indicate the passenger's desired pickup location (or current GPS location), the desired destination location (which may identify a predefined vehicle stop and/or a user-specified passenger destination), and a pickup time. The transportation system 102 receives the ride request, processes the request, and dispatches an autonomous vehicle 103 (when and if one is available) to pick up the passenger at the designated pickup location and at the appropriate time. The transportation system 102 can also generate and send a suitably configured confirmation message or notification to the passenger, to let the passenger know that a vehicle 103 is on the way. The confirmation may also serve other purposes, as explained in more detail below.

The building security and access system 106 can be an independent and distinct subsystem, or it can be integrated with the transportation system 102 and/or any of the other systems described herein. The security and access system 106 may be implemented with one or more backend server systems, which may be cloud-based, network-based, or resident at the particular campus or geographical location serviced by the transportation system 102. The security and access system 106 regulates and controls access to secured locations, which may include, without limitation: buildings, structures, rooms, regions, floors, offices, gates, doors, cabinets, sections of a building, areas, zones, closets, sections, hallways, passageways, corridors, lockers, containers, storage devices, or the like. The security and access system 106 can grant access to registered users as needed. In certain embodiments, the security and access system 106 utilizes: security badges or cards; RFID tags; fingerprint scanners; bar code readers; biometric scanners; keypads; or the like. In certain embodiments, the autonomous vehicles 103 controlled by the transportation system 102 include compatible onboard security and access hardware that can be used to verify the identity of the passengers.

The shipping/delivery system 108 can be an independent and distinct subsystem, or it can be integrated with the transportation system 102 and/or any of the other systems described herein. The shipping/delivery system 108 may be implemented with one or more backend server systems, which may be cloud-based, network-based, or resident at the particular campus or geographical location serviced by the transportation system 102. The shipping/delivery system 108 can be used to schedule, regulate, and control the delivery of packages, parts, products, or any object from one location to another, using the autonomous vehicles 103. To this end, the shipping/delivery system 108 may include or cooperate with secure compartments, lockers, trunk space, or storage units onboard the vehicles. In addition, the shipping/delivery system 108 may cooperate with the security and access system 106 to grant access to the secure features of the shipping/delivery system 108 if so desired. For example, if an autonomous vehicle 103 is used to transport a package to a destination location, the shipping/delivery system 108 and the security and access system 106 may cooperate to grant "unlock" privileges to only certain registered users. Thus, a user with unlock privileges will be able to retrieve the package from the vehicle 103 when it arrives at the destination location.

The navigation and map system 110 can be an independent and distinct subsystem, or it can be integrated with the transportation system 102 and/or any of the other systems described herein. The navigation and map system 110 may be implemented with one or more backend server systems, which may be cloud-based, network-based, or resident at the particular campus or geographical location serviced by the transportation system 102. In some embodiments, the navigation and map system 110 includes or cooperates with compatible features, functions, or applications resident at the autonomous vehicles 103 and/or resident at the user devices 104. For example, a user device 104 may include a locally installed navigation or mapping app that receives and processes data provided by the navigation and map system 110. In this regard, the user device 104 may leverage cached map data, or it may rely on map data provided via the communication network 112. As explained in more detail below, the navigation and map system 110 can be used to provide directions from a passenger drop-off location to a passenger-specified destination (which may be a location inside of a building, an outside location near the drop-off location, etc.).

The communication network 112 provides and supports data connectivity between the various components and systems in the operating environment 100. In practice, the communication network 112 may be any digital or other communications network capable of transmitting messages or data between devices, systems, or components. In certain embodiments, the communication network 112 includes a packet switched network that facilitates packet-based data communication, addressing, and data routing. The packet switched network could be, for example, a wide area network, the Internet, or the like. In various embodiments, the communication network 112 includes any number of public or private data connections, links or network connections supporting any number of communications protocols. The communication network 112 may include the Internet, for example, or any other network based upon TCP/IP or other conventional protocols. In various embodiments, the communication network 112 could also incorporate a wireless and/or wired telephone network, such as a cellular communications network for communicating with mobile phones, personal digital assistants, and/or the like. The communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Figure 2:
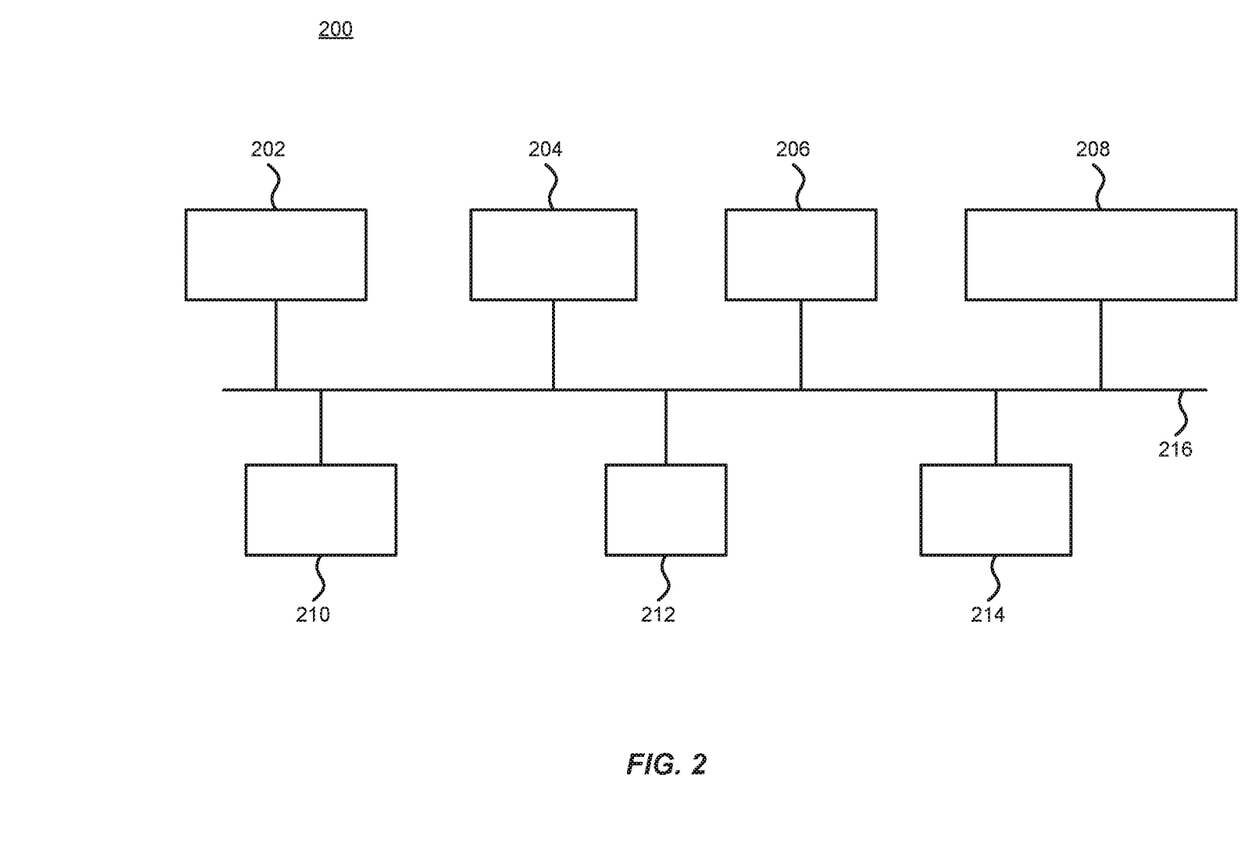
FIG. 2 is a block diagram of an exemplary embodiment of a processor-based hardware platform suitable for use in various system components described herein.

The various systems, devices, and components in the operating environment 100 may include or cooperate with computer-based or processor-based hardware. In this regard, FIG. 2 is a block diagram of an exemplary embodiment of a hardware platform 200 suitable for use in the operating environment 100. More specifically, at least one instantiation of the hardware platform 200 (or something similar) can be utilized with each of the elements depicted in FIG. 1. Moreover, at least one instantiation of the hardware platform 200 (or something similar) can be deployed in each of the autonomous vehicles 103, for example, as an onboard electronic control unit. The hardware platform 200 is implemented as a processor-based or computer-based device, system, or component that is designed, configured, and programmed to meet the needs of the particular system or subsystem.

The illustrated embodiment of the hardware platform 200 includes, without limitation: a processor architecture 202 having at least one processor device; a suitable amount of memory 204, which includes at least one computer/processor readable media element; a data storage apparatus 206; device-specific hardware, software, firmware, and/or features 208; a user interface 210; a communication module 212; and a display element 214. Of course, the hardware platform 200 may include additional elements, components, modules, and functionality configured to support various features that are unrelated to the subject matter described here. For example, the hardware platform 200 may include certain features and elements to support conventional functions that might be related to the particular implementation and deployment of the hardware platform 200. In practice, the elements of the hardware platform 200 may be coupled together via a bus or any suitable interconnection architecture 218.

The processor architecture 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Moreover, the processor architecture 202 may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor architecture 202 such that the processor architecture 202 can read information from, and write information to, the memory 204. In the alternative, the memory 204 may be integral to the processor architecture 202. As an example, the processor architecture 202 and the memory 204 may reside in an ASIC. At least a portion of the memory 204 can be realized as a computer storage medium, e.g., a tangible computer readable media element having non-transitory processor-executable instructions stored thereon. The computer-executable instructions can be configurable such that, when read and executed by the processor architecture 202, cause the hardware platform 200 to perform certain tasks, operations, functions, and processes described in more detail herein. In this regard, the memory 204 may represent one suitable implementation of such computer-readable media. Alternatively or additionally, the hardware platform 200 could receive and cooperate with computer-readable media (not separately shown) that is realized as a portable or mobile component or platform, e.g., a portable hard drive, a USB flash drive, an optical disc, or the like.

The data storage apparatus 206 can be realized with the memory 204, or it can be implemented as a physically distinct component. The data storage apparatus 206 employs a nonvolatile storage technology to save and maintain data as needed. For example, the data storage apparatus 206 can include flash memory and/or a hard disk formatted to save data that is generated and used by the corresponding host system.

The device-specific hardware, software, firmware, and features 208 may vary from one embodiment of the hardware platform 200 to another. For example, the device-specific hardware, software, firmware, and features 208 will support telephone functions and features when the hardware platform 200 is realized as a mobile telephone, conventional personal computer functions and features if hardware platform 200 is realized as a laptop or tablet computer, vehicle-centric functions and features if the hardware platform 200 is realized as an onboard electronic control unit, etc. In practice, certain portions or aspects of the device-specific hardware, software, firmware, and features 208 may be implemented in one or more of the other blocks depicted in FIG. 2.

The user interface 210 may include or cooperate with various features to allow a user to interact with the hardware platform 200. Accordingly, the user interface 210 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the hardware platform 200. The user interface 210 may include one or more graphical user interface (GUI) control elements that enable a user to manipulate or otherwise interact with an application via the display element 214.

The communication module 212 facilitates data communication between the hardware platform 200 and other components as needed during the operation of the hardware platform 200. Referring again to FIG. 1, the communication module 212 (of the user device 104) enables the user device 104 to communicate with the transportation system 102, the security and access system 106, the navigation and map system 110, and/or the shipping/delivery system 108 as needed. Similarly, the communication module 212 (of the security and access system 106) enables the security and access system 106 to communicate with the transportation system 102 as needed. In practice, an embodiment of the hardware platform 200 may support wireless data communication and/or wired data communication, using various data communication protocols. For example, the communication module 212 could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (Wi-MAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module 212 could support one or more wired/cabled data communication protocols, including, without limitation: Ethernet; home network communication protocols; USB; IEEE 1394 (Firewire); hospital network communication protocols; and proprietary data communication protocols.

The display element 214 is suitably configured to enable the hardware platform 200 to render and display various screens, GUIs, GUI control elements, drop down menus, auto-fill fields, text entry fields, message fields, or the like. Of course, the display element 214 may also be utilized for the display of other information during the operation of the hardware platform 200, as is well understood. Notably, the specific configuration, operating characteristics, size, resolution, and functionality of the display element 214 can vary depending upon the practical implementation of the hardware platform 200. For example, if the hardware platform 200 is a laptop computer, then the display element 214 may be a relatively large monitor. Alternatively, if the hardware platform 200 is a cellular telephone device, then the display element 214 may be a relatively small integrated display screen, which may be realized as a touch screen. When the hardware platform 200 is implemented onboard a vehicle 103, the display element 214 can be integrated in an instrument panel, an instrument cluster, a head-up display, or the like.

The autonomous vehicle based transportation system 102 described here can be suitably configured to provide enhanced passenger convenience features. In accordance with certain embodiments, the transportation system 102 is linked to the building security and access system 106 to automatically grant security clearance to the passenger in response to a ride request issued by the passenger. In accordance with some embodiments, the transportation system 102 is linked to the navigation and map system 110 to automatically generate and provide directions to the passenger's destination location. In accordance with other embodiments, the transportation system 102 is linked to the shipping/delivery system 108 to enable the driverless vehicles 103 to deliver packages or objects in a safe and secure manner. Of course, any or all of these enhanced features can be supported, depending on the particular implementation of the operating environment 100.

Figure 3:
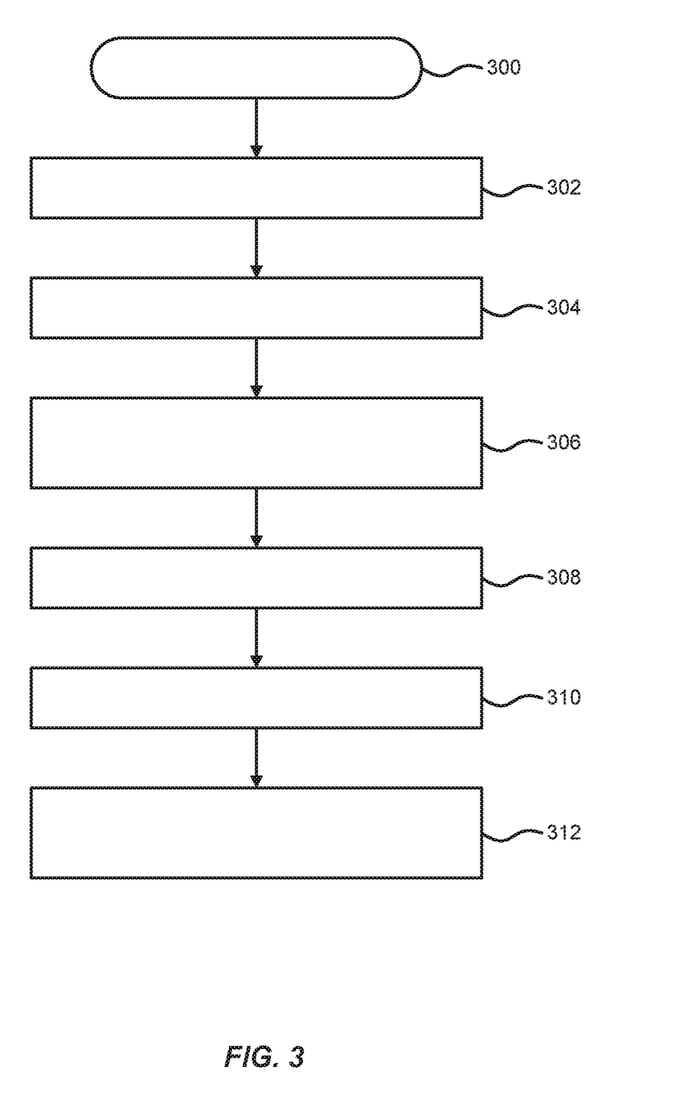
FIG. 3 is a flow chart that illustrates an exemplary embodiment of an enhanced autonomous taxi service methodology.

FIG. 3 is a flow chart that illustrates an exemplary embodiment of an enhanced autonomous taxi service process 300. The various tasks performed in connection with the process 300 may be performed by software, hardware, firmware, or any combination thereof. For illustrative purposes, the following description of the process 300 may refer to elements mentioned above in connection with FIGS. 1 and 2. In practice, portions of the process 300 may be performed by different elements of the described system, e.g., the transportation system 102, the user device 104, or the security and access system 106. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The exemplary embodiment of the process 300 receives a ride (pickup) request for an autonomous vehicle based transportation system (task 302). In a typical scenario, the ride request is initiated or created by the passenger or by any registered or authorized user of the transportation system. For example, the ride request can be created and sent from the user device 104, either by the passenger or on behalf of the passenger. Although not always required, this example assumes that the ride request includes or otherwise identifies at least the following information: the passenger (by username, actual given name, an ID number, or the like); a pickup location (which may be a predefined and fixed vehicle pickup/drop-off location, or a current GPS position of the user); and a destination. The ride request may also specify a pickup time, a desired destination time, the number of passengers, whether or not a delivery is involved, and/or other options or preferences.

This example assumes that the ride request identifies a destination location for the autonomous vehicle. The destination location may be, without limitation: a building secured by a security system; a predefined pickup/drop-off location of the transportation system; an intersection; an area of a campus; an address; a mailstop; or the like. Alternatively, the process 300 can calculate or derive the destination location based on the passenger-entered destination. In certain scenarios, the ride request can identify a specific passenger destination that is different than the destination location for the vehicle. In this regard, the passenger destination may be any of the following, without limitation: a structure, building, room, area, zone, closet, section, hallway, passageway, corridor, locker, container, office, storage device, or the like, which may be located at or near the destination location. For example, the ride request may identify a particular vehicle stop near Building A of a campus, along with an identifiable conference room within Building A as the passenger's desired destination.

This example assumes that the ride request identifies a building as the passenger's destination location. Accordingly, the process 300 reviews or analyzes the ride request to identify the destination building (task 304). The process 300 may coordinate with the security and access system 106 to determine whether or not the passenger requires user-specific security clearance to access the identified destination location (task 306). This example assumes that the passenger needs access to the destination building. In other scenarios, the passenger building itself is unlocked or open access, but the passenger needs access to a secured structure, building, room, area, zone, closet, section, hallway, passageway, corridor, locker, container, office, storage device, or the like, located inside the open building. Regardless of the type of access required, the process 300 can determine that the passenger requires security clearance to access the destination location.

After receiving and processing the ride request, the process 300 sends a confirmation to the passenger (task 308). The confirmation indicates that the ride request has been processed and that a vehicle has been (or will be) dispatched. In addition, the confirmation can indicate that the passenger has been (or will be) granted the required security clearance.

The process 300 can leverage the functionality of the security and access system 106 to grant the user-specific security clearance to the passenger. The granted security clearance can be a temporary security clearance that is valid for a limited period of time (e.g., a few hours, a day, or a week), or that is valid for a designated number of entries (e.g., only once access attempt, ten access attempts, etc.). The security clearance is linked to, or is otherwise associated with, one or more security measures, devices, or mechanisms that are registered to the passenger for purposes of uniquely identifying the passenger. For example, the granted security clearance can be linked to the passenger's security badge, the passenger's security code, the passenger's fingerprint record, or the like. To this end, the particular security mechanism can utilize a retina scan, a fingerprint reader, or other biometric sensor, a PIN number assigned to the passenger, multifactor authentication methodologies, etc.

or the like. Thus, the security and access system database can be temporarily reconfigured to update the passenger's security profile in response to receiving and processing the ride request. Moreover, each autonomous vehicle operated by the transportation system 102 can include a compatible onboard access device or subsystem, such as a security badge reader to read the security bade that is registered to the passenger, a biometric scanner, an RFID reader, or the like.

The user-specific security clearance can be granted as soon as the ride request is received or processed, or it can be granted at any convenient time. In certain embodiments, the temporary security clearance for the passenger is activated after the autonomous vehicle has reached the identified drop-off destination with the passenger. In this regard, the security and access system 106 may need to be in communication with the transportation system 102 during the passenger's ride to the designated destination location. Regardless of the timing, this enhanced feature will automatically provide access rights to the passenger with little to no additional effort on the part of the passenger. Rather, the passenger will be able to gain entry to the specified destination location after departing the autonomous vehicle.

As another enhanced feature, the process 300 may provide navigation directions to assist the passenger. This example assumes that the ride request includes or otherwise identifies a numbered conference room as the desired passenger destination. As explained above, the vehicle drop-off location can be determined based on the passenger destination. In practice, the drop-off location can be the closest "fixed" drop-off point, or it can be the closest accessible location, relative to the passenger destination. The process 300 identifies the passenger destination location (task 310) and coordinates with the navigation and map system 110 to obtain appropriate navigation instructions to guide the passenger from the vehicle drop-off location to the identified passenger location (task 312). The navigation instructions may be generated at the navigation and map system 110 and/or locally at the user device 104, depending on the particular implementation. The process 300 may also generate and send a suitably formatted confirmation to the passenger (e.g., to the user device 104), wherein the confirmation indicates that navigation instructions are available to the passenger.

This example assumes that the navigation instructions are provided to a mobile user device 104 that is owned, operated, or otherwise associated with the passenger. In this regard, the mobile user device 104 may have a suitably configured mobile app that is compatible with the navigation features described herein. In accordance with a typical use case, the navigation instructions include walking directions from the vehicle drop-off location to the specified passenger destination. As mentioned previously, the passenger destination may be an indoor or an outdoor location at or near the vehicle drop-off location. For instance, the passenger destination may be, without limitation: a building; an intersection; an area of a campus; an address; a mailstop; or any location, room, area, zone, closet, section, hallway, passageway, corridor, locker, container, office, storage device, in a building. For increased accuracy, the process 300 can access and process building layout data that is maintained for buildings in or near the operating environment 100. The building layout data can be helpful to provide specific walking directions to an indoor destination, such as a conference room, a break room, an office, or the like.

The process 300 can leverage existing navigation and GPS-based technologies to determine and process the user's current geographical position as needed. In some situations (when the user is indoors and GPS coverage is poor), the walking directions or a displayed map with walking instructions may still be helpful to the user. These and other options are contemplated by this description.

In accordance with certain embodiments, the system manages security clearance based on information obtained from a calendar application associated with the passenger. In this regard, the process 300 described above can communicate with the passenger's calendar application (e.g., a mobile app) to receive and process schedule information for an event that identifies a secured area controlled by the system. The calendar information can be obtained independently or in conjunction with a ride request. As an example, the passenger's calendar may include schedule information for an event that takes place at a designated building that requires security clearance. The process 300 can review the calendar event data, identify the secured building, and request the appropriate user-specific security clearance for the passenger. Thus, the schedule information obtained from the calendar application can be utilized to pre-authorize user access to the secured location, building, or area, in the manner described in more detail above. Furthermore, the system can withdraw or revoke the user-specific security clearance following the scheduled conclusion of a calendared event of interest. For example, if the calendared event is scheduled to end at 3:30 PM, then the process 300 can automatically deactivate the corresponding user-specific security clearance at 3:30 PM (or shortly thereafter). Consequently, if the user leaves the secured location after the scheduled end time of the event, then subsequent access attempts to that secured location will be denied.

Although the example described above relates to the granting of security access at a destination location, the methodology can be extended to contemplate an environment having any number of security checkpoints, security gates, or the like. For example, at least one security checkpoint might reside along the route between the destination location of the vehicle and the passenger's ultimate destination. In such a scenario, the methodology described herein can be utilized to coordinate with the security system to grant security clearance to the passenger for some or all of the security checkpoints if so desired. Accordingly, the passenger can conveniently pass through a number of security checkpoints, including the last secured location or area corresponding to the final destination, without having to independently and individually request and obtain security clearances in transit. In practice, the system can provide security access confirmations to the passenger's mobile device, wherein the confirmations are associated with the different security checkpoints. In this regard, access confirmations can be delivered all at once, in groups, or in an ongoing manner as the user passes each security checkpoint.

Figure 4:
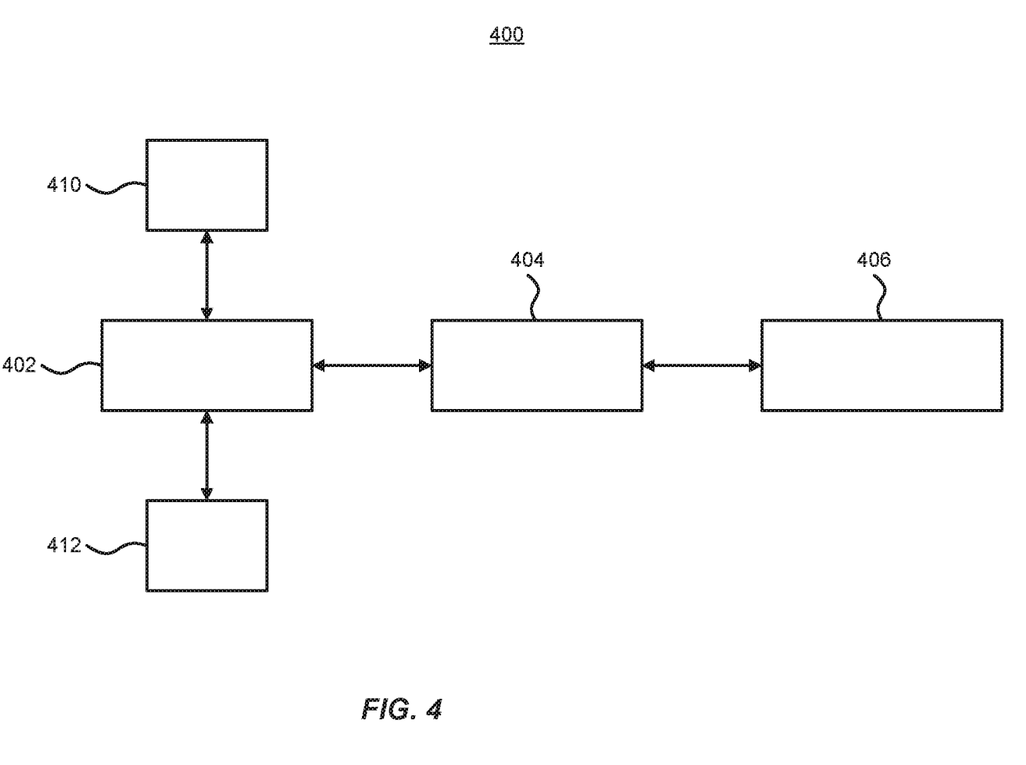
FIG. 4 is a simplified block diagram that illustrates an operating environment for an autonomous vehicle based transportation system.

FIG. 4 is a simplified block diagram that illustrates an operating environment 400 for an autonomous vehicle based transportation system 402, a related calendaring system 404, and a related building security and access system 406. Although the transportation system 402 can include or cooperate with any number of user devices 410 and any number of autonomous vehicles 412, FIG. 4 depicts only one user device 410 and only one autonomous vehicle 412 (for the sake of clarity and simplicity). The configuration and functionality of the transportation system 402, the building security and access system 406, the user device 410, and the autonomous vehicle 412 are as described above with reference to FIG. 1, and these items will not be redundantly described in detail here. FIG. 4 represents an alternative operating environment 400 that supports certain calendaring and scheduling features (some of which have been previously described). Accordingly, the calendaring system 404 cooperates with the transportation system 402 and with the building security and access system 406 as needed to support a variety of user convenience features and functions.

The transportation system 402 communicates with the user device 410 (e.g., a passenger's mobile device), which can be used to request a reservation for a ride. As mentioned previously, a request can include a request to access a secure location or building and/or a request for navigation or walking directions. The transportation system 402 receives and processes the user request, confirms the reservation, obtains point to point directions to the destination location if needed, and manages the dispatching and routing of the autonomous vehicle 412 as appropriate for the passenger request. To this end, the transportation system 402 can provide or share special passenger handling instructions with the calendaring system 404 and/or with the building security and access system 406. In addition, the transportation system 402 can provide or share details of the passenger's travel progress through security checkpoints, such that the host or organizer of a meeting or an event can keep track of the schedule. Similarly, the calendaring system 404 can confirm meeting attendance and meeting locations and provide such information to the transportation system 402, the user device 410, and/or the building security and access system 406 as needed. In certain embodiments, the calendaring system 404 provides or shares conference room location information (e.g., the name or number of the conference room, the building number, the floor number, etc.) and the closest entrance for accessing the conference room, wherein the conference room has been identified by the host or meeting organizer.

The calendaring system 404 manages calendar, scheduling, and certain location-based features and functions. The calendaring system 404 serves as an intermediary or interface between the transportation system 402, the user device 410, and the building security and access system 406. The calendaring system 404 may be maintained, operated by, or supported on behalf of an enterprise, a business, a campus, or the like to handle the scheduling of meetings, events, and services for any group of users. For example, the calendaring system 404 can provide any or all of the following features and functionality, without limitation: maintain and manage meeting details for users (e.g., the meeting host, the date/time, the location, the attendees, and related security status and information as needed); maintain, manage, and provide directions and/or mapping information (which may be related to a conference room, security access points, designated or preferred building entrances, or the like); and maintain and manage information related to special handling or accommodations (e.g., for blind or disabled attendees, for wheelchair-bound attendees, for attendees that require a service animal, or the like). The calendaring system 404 is in communication with the transportation system 402 for purposes of confirming meeting attendance and location information, to share conference room location information, and other useful information that can be passed along to users of the transportation system 402.

As described above with reference to FIG. 1, the building security and access system 406 manages access to secured buildings, locations, areas, and the like. The building security and access system 406 can enable access in accordance with the particular security system(s) employed by the site. For example, the building security and access system 406 can handle temporary security badges/devices (with or without requiring an escort), security badges/devices issued by the same company, entity, or enterprise, or security badges/devices issued by a different company, entity, or enterprise (i.e., via a trusted supplier or partner). The building security and access system 406 may be in communication with the calendaring system 404 for purposes of coordinating security-related information with scheduled meetings, conferences, and events. In this regard, the building security and access system 406 can provide a meeting host with details of attendee location in the building, based on the attendee passing through designated security access points. As another example, the calendaring system 404 and the building security and access system 406 can exchange information related to an attendee's security status and related level of trustworthiness (e.g., whether an attendee requires an escort, whether an attendee is a first-time visitor, whether an attendee is trusted to be unescorted, and the like).

It should be appreciated that the processing intelligence, control methodologies, and other functionality described above may reside at one or more of the components and systems of the operating environment. In certain implementations, for example, most of the processing intelligence is carried out by the various network-based systems, and the autonomous vehicles and the user devices play a secondary role. In other implementations, however, more of the processing load can be handled by the user devices and/or by the computer-based systems onboard the autonomous vehicles. Moreover, although FIG. 1 depicts distinct blocks for the transportation system 102, the security and access system 106, the shipping/delivery system 108, and the navigation and map system 110, the functionality of these systems can be combined and implemented in one or more hardware platforms. Likewise, the block diagram representation of FIG. 4 is merely one simplified rendition of an environment that includes an autonomous vehicle based system. These and other hardware realizations are contemplated by this disclosure.

To summarize, the exemplary embodiments presented here relate to various features of a vehicle-based transportation system that provide automated building access, drop-off location identification, and last mile directions based on activity calendaring. The disclosed system also provides a methodology that provides participant travel progress to the activity host. The disclosed subject matter provides seamless access to a destination building based on activity inclusion, and it can provide drop off location information to the vehicle that is closest to the actual building entry point. Certain implementations of the system also provide participant last mile instructions including vehicle drop off location based on activity calendaring inclusion, participant familiarity with the activity facility, and any participant special needs. The disclosed features of the system allow the activity host to infer arrival time by providing status updates of the participant's travel progress.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-based system comprising a memory element and a processor device communicatively coupled to the memory element, the memory element having computer-executable instructions stored thereon and configurable to be executed by the processor to cause the computer-based system to:
   receive a ride request for a vehicle based transportation system, the ride request identifying a passenger, a pickup location, and a destination location;
   determine that the passenger requires user-specific security clearance to access a secured area that is outside of the vehicle and at or near the destination location; and
   coordinate with a security system associated with the secured area to grant the user-specific security clearance to the passenger.

2. The computer-based system of claim 1, wherein the user-specific security clearance is linked to a security badge registered to the passenger.

3. The computer-based system of claim 1, wherein the computer-executable instructions cause the computer-based system to activate the user-specific security clearance after an autonomous vehicle of the vehicle based transportation system has reached the identified destination with the passenger.

4. The computer-based system of claim 1, wherein the computer-executable instructions cause the computer-based system to send a confirmation to the passenger, the confirmation indicating that the passenger has been granted the user-specific security clearance.

5. The computer-based system of claim 1, wherein:
   the ride request identifies a passenger destination; and
   the computer-executable instructions cause the computer-based system to provide navigation instructions to guide the passenger to the identified passenger destination.

6. The computer-based system of claim 1, the computer based system determines that the passenger requires user-specific security clearance to access a secured area based on passenger calendaring information.

7. A computer-based system comprising a memory element and a processor device communicatively coupled to the memory element, the memory element having computer-executable instructions stored thereon and configurable to be executed by the processor to cause the computer-based system to:
   receive a ride request at a vehicle based transportation system, the ride request identifying a passenger, a pickup location, and a passenger destination;
   determine, by the vehicle based transportation system, a vehicle drop-off location based on the passenger destination, wherein the vehicle drop-off location and the passenger destination are at different locations;
   coordinate, by the vehicle based transportation system, with a navigation system to obtain navigation instructions to guide the passenger from the vehicle drop-off location to the passenger destination; and
   generate, by the vehicle based transportation system, a confirmation to a device associated with the passenger, the confirmation indicating the navigation instructions to the passenger.

8. The computer-based system of claim 7, wherein the coordinating comprises accessing building layout data maintained for the building.

9. The computer-based system of claim 7, wherein the device is a mobile device associated with the passenger and wherein the computer-executable instructions cause the vehicle based transportation system to provide the navigation instructions to the mobile device associated with the passenger.

10. The computer-based system of claim 7, wherein the navigation instructions include walking directions from the vehicle drop-off location to the passenger destination.

11. The computer-based system of claim 7, wherein the coordinating comprises accessing passenger calendaring information to determine a meeting location.

12. The computer-based system of claim 11, wherein the meeting location is a room within a building, and wherein the navigation instructions include directions from the vehicle drop-off location to the room within the building.

13. The computer-based system of claim 7, wherein the meeting location is an outside area, and wherein the navigation instructions include directions from the vehicle drop-off location to the outside area.

* * * * *